(12) United States Patent
Baig et al.

(10) Patent No.: US 12,536,772 B2
(45) Date of Patent: Jan. 27, 2026

(54) REAL TIME VISUAL MITIGATION OF A LIVE CAMERA FEED

(71) Applicant: Apple Inc., Cupertino, CA (US)

(72) Inventors: Mohammad Haris Baig, San Jose, CA (US); Praveen Gowda Ippadi Veerabhadre Gowda, San Jose, CA (US)

(73) Assignee: Apple Inc., Cupertino, CA (US)

( * ) Notice: Subject to any disclaimer, the term of this patent is extended or adjusted under 35 U.S.C. 154(b) by 369 days.

(21) Appl. No.: 18/344,514

(22) Filed: Jun. 29, 2023

(65) Prior Publication Data

US 2024/0005630 A1 Jan. 4, 2024

Related U.S. Application Data

(60) Provisional application No. 63/367,399, filed on Jun. 30, 2022.

(51) Int. Cl.

| | |
|---|---|
| *G06V 10/75* | (2022.01) |
| *G06F 3/01* | (2006.01) |
| *G06F 3/14* | (2006.01) |
| *G06V 10/25* | (2022.01) |
| *G06V 10/54* | (2022.01) |

(52) U.S. Cl.
CPC .......... *G06V 10/758* (2022.01); *G06F 3/013* (2013.01); *G06F 3/14* (2013.01); *G06V 10/25* (2022.01); *G06V 10/54* (2022.01)

(58) Field of Classification Search
CPC ...... G06V 10/758; G06V 10/25; G06V 10/54; G06F 3/013; G06F 3/14
USPC .......................................................... 382/159
See application file for complete search history.

(56) References Cited

U.S. PATENT DOCUMENTS

| | | | | |
|---|---|---|---|---|
| 9,396,552 | B1* | 7/2016 | Kloer | G06Q 40/10 |
| 11,468,275 | B1* | 10/2022 | Blechschmidt | G06N 20/00 |
| 12,395,722 | B2* | 8/2025 | Figueroa | G06V 10/945 |
| 2009/0252913 | A1* | 10/2009 | Cincotti | F41H 3/02 |
| | | | | 156/289 |

* cited by examiner

*Primary Examiner* — Gabriel I Garcia
(74) *Attorney, Agent, or Firm* — Blank Rome LLP

(57) ABSTRACT

Mitigating triggering display conditions includes obtaining an image frame, comprising image data captured by a camera, determining, from the image data, an image statistic for at least a portion of the image frame. The technique also includes determining that the image statistic satisfies a trigger criterion, where the trigger criterion is associated with at least one predetermined display condition and, in response, modifying an image parameter for the at least a portion of the image frame. The technique also includes rendering the image frame, in accordance with the modified image parameter, where the predetermined display condition is avoided in the rendered image frame, in accordance with the rendering, and displaying the rendered image frame.

20 Claims, 7 Drawing Sheets

REAL TIME VISUAL MITIGATION OF A LIVE CAMERA FEED

FIELD OF THE INVENTION

This disclosure relates generally to image processing. More particularly, but not by way of limitation, this disclosure relates to techniques and systems for performing visual mitigation of visual triggers in a pass-through operation.

BACKGROUND

Some users are sensitive to certain visual triggers. For example, lights flashing at a specific frequency or certain patterns in a field of view, may be visually taxing. These events can be particularly taxing under certain circumstances, such as when viewed in a confined environment.

DETAILED DESCRIPTION

Figure 1A:
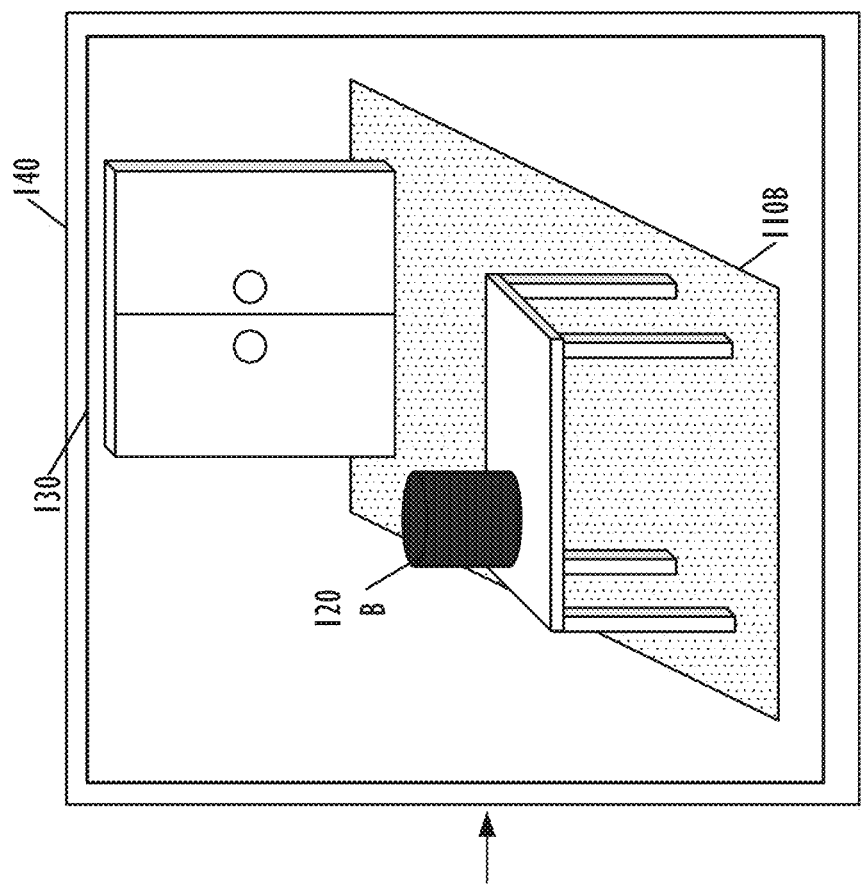
FIG. 1A shows an example pre- and post-processed image frame, according to one or more embodiments.

In general, embodiments described herein are directed to a technique for modifying image capture and/or rendering to mitigate the display of visual triggers to a user. The visual trigger may be detected in raw image data prior to or during rendering, such that the image data can be modified during rendering, to remove, or otherwise obfuscate, the visual trigger from the image for display. For example, if a device detects that a portion of the image will have a flashing light at a certain frequency that is determined to be a visual trigger, the device can modify the presentation at a corresponding portion of the screen having the visual trigger, such that the resulting image presented to the user does not include the visual trigger. As such, embodiments described here can identify and mitigate visual triggers in real time.

In the following description, for purposes of explanation, numerous specific details are set forth in order to provide a thorough understanding of the disclosed concepts. As part of this description, some of this disclosure's drawings represent structures and devices in block diagram form, in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that, in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of multi-modal processing systems having the benefit of this disclosure.

Various examples of electronic systems and techniques for using such systems in relation to various technologies are described.

A physical environment, as used herein, refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include: head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, u LEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Turning now to FIG. 1A, an example pre- and post-processed image frame is depicted, according to one or more embodiments. According to some embodiments, image data 100 may be captured by a camera on a device. The image data 100 depicts a scene of a physical environment having multiple objects with various textures, patterns, colors, and the like. As shown, the physical environment includes a rug 110A, having a dotted pattern, upon which a table is placed. On the table is a cylinder 120A, having a striped pattern. According to some embodiments, the image data 100 may be captured by an outward facing camera of a device. As such, the raw image data may be captured by one or more camera sensors of the device in preparation for presentation to the user.

According to some embodiments, the raw image data 100 can be analyzed to detect or predict regions of the image, which may be visually taxing. The prediction may be determined, for example, by applying the image data to a network that has been trained to predict textures or other image characteristics to detect visual content either in a single frame or across multiple frames. In some embodiments, an analysis technique is used on the image data, based on brightness statistics and/or sensor readings, and/or changes in brightness statistics and/or sensor readings, within and/or across images which are indicative of visual content. In response, a mitigation technique may be applied when the image content is processed and/or rendered to reduce or remove the visual trigger from the image before display.

Figure 1A:
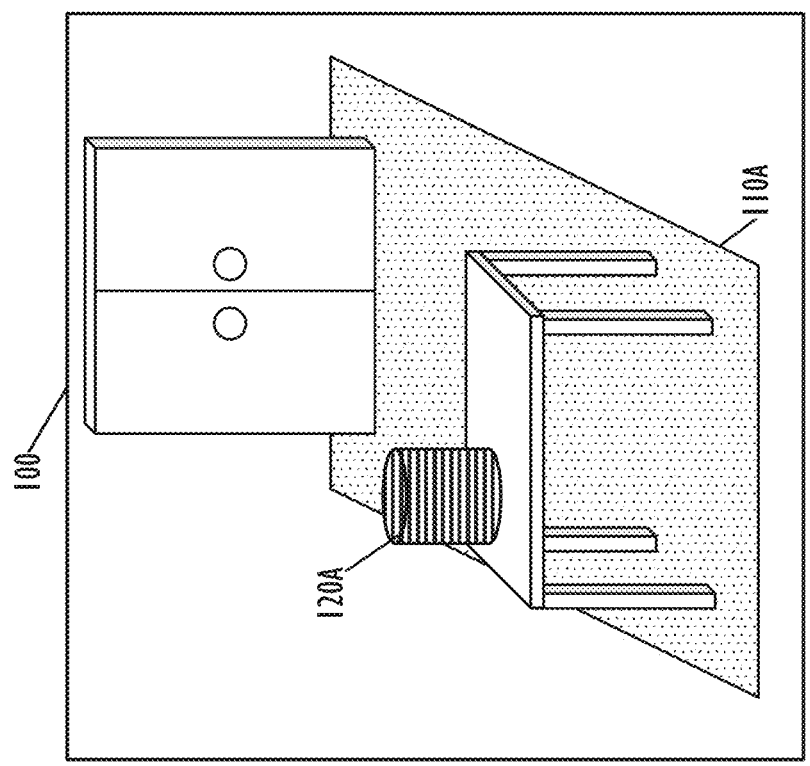
Figure 1B:
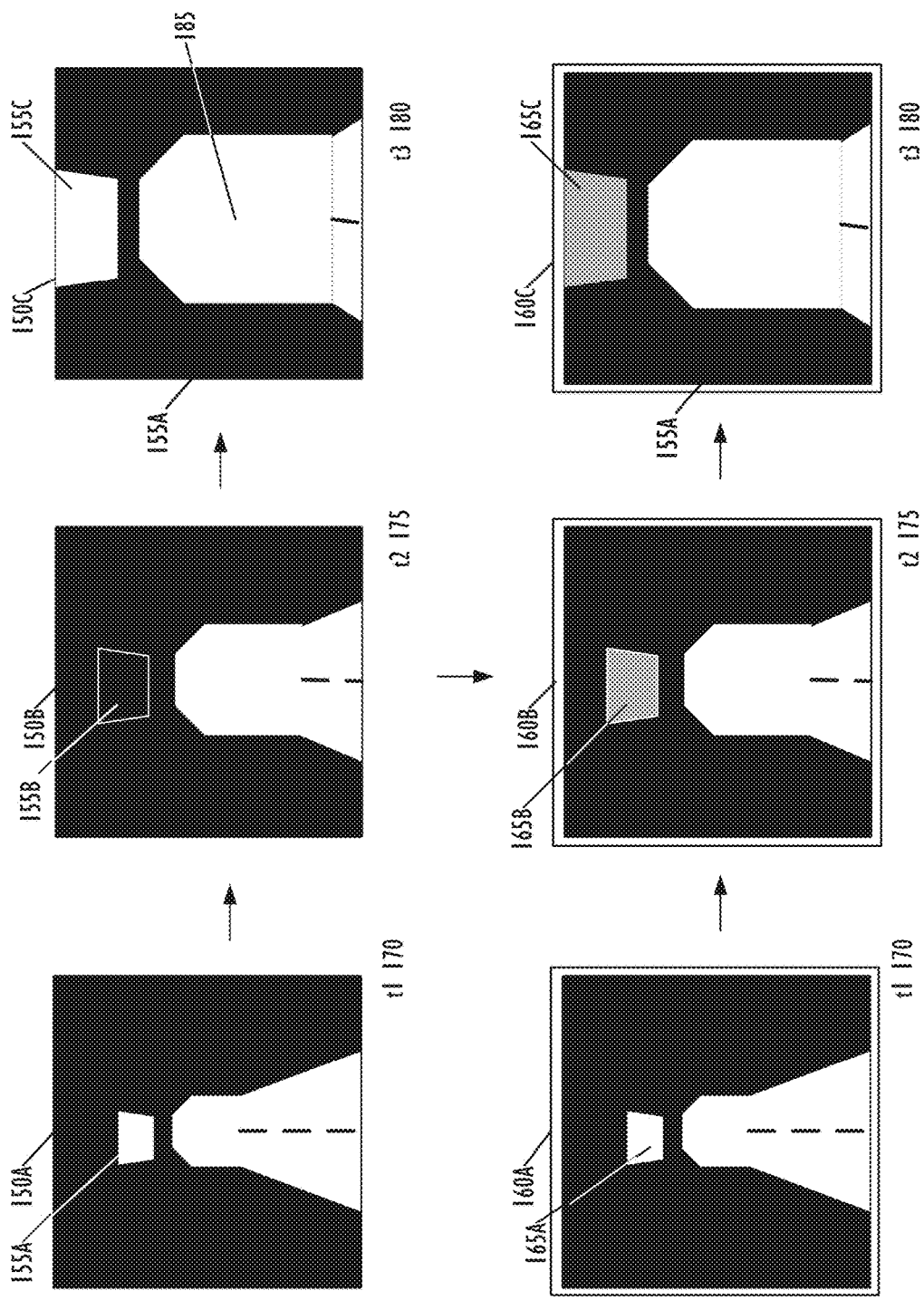
FIG. 1B shows an example pre- and post-processed set of image frames, according to one or more embodiments.

FIG. 1B shows an example pre- and post-processed set of image frames, according to one or more embodiments. According to some embodiments, the image data 150 may be captured by a camera facing away from the user. The raw image data may be captured by one or more camera sensors of the device in preparation for presentation to the user via a display in real time.

The image data 150 depicts frames captured of a scene of a physical environment. As shown, the physical environment includes a dark tunnel with an overhead light. At t1 170, a first frame 150A is captured. The first frame of pre-processed data 150A includes the overhead light 155A in a bright state. At t2 175, a second frame 150B is captured. The second frame of pre-processed data 150B includes the overhead light 155B in a darkened state. Finally, at t3 180, a third frame 150C is captured. The third frame of pre-processed data 150C includes the overhead light 155C in a bright state yet again. As such, the overhead light is flickering, and the flicker is captured across the multiple frames. According to one or more embodiments, although any of the individual frames might not satisfy a visual trigger criterion for a visually taxing experience, the overhead light may be perceived to be flickering when the images are played in sequence, e.g., during a live feed of the physical environment, which may cause a visually taxing experience.

In some embodiments, the triggering condition for the set of pre-processed frames is determined based on a calculation of one or more difference statistics across frames over some period of time. For example, a sudden change in brightness may indicate a triggering condition, or a flickering, such as the example shown in FIG. 18. That is, a changing frequency of light may result in a visually taxing experience. Thus, one or more difference statistics may be determined across two or more frames, where the difference statistic indicates a change in brightness and/or a frequency of the change in brightness. Thus, the difference statistic may be determined for consecutive frames, and/or across multiple frames. For example, a threshold change in brightness may be tolerated over a predetermined number of frames to compensate for the frame rate.

As another example, the approaching end of the tunnel 185 may be observed over the set of image frames 150 such that it can be determined that the user is going to exit the tunnel. In some embodiments, the sudden change in brightness experienced by the user upon exiting the tunnel may be determined to be a triggering event. As such, the system may prepare to render the image frames with an adjusted, reduced brightness upon exiting the tunnel.

When the triggering condition is satisfied in the raw data, a mitigating treatment is determined and applied to the raw image data when the raw image data is processed and/or rendered. In some embodiments, the treatment can be applied to the raw image data between the time it is captured by the sensor of a device and before it is presented to a user of the device, for example, in the scenario of a user seeing a live feed of their physical environment. As such, an event associated with a visually taxing experience may occur, then, the event is captured by a camera, then a modified version of the event is shown to a user using a display, such that the user does not experience the event through the display.

An example of a mitigating treatment is shown with frames 160A-160C, which depict rendered versions of the pre-processed image data shown at 150A-150C. Thus, frame 160A depicts a presented version of the raw image data captured at t1 170, shown at 150A. As such, the user can see the overhead light 165A as it naturally appears. That is, it is consistent with the overhead light 155A of raw image frame 150A. The next frame, 160B, shows a presented version of the raw image data captured at t2 175, shown at 150B. In this frame, for this example, the device may determine that the change in brightness in the raw image frames 155A and 155B are associated with a difference statistic that satisfy a trigger criterion. As such, before the image is presented to the user, a treatment is applied. For purposes of this example, the brightness of the overhead light is reduced at 155B. In some embodiments, the brightness of the overhead light may be adjusted in the processed image to a normalized intensity, based on the bright light and dark light. Thus, while a difference statistic between the overhead lights 155A and 155B may satisfy a trigger criterion, the difference statistic from the resulting rendered versions of the overhead light at 165A and 165B may not satisfy the triggering condition and, similarly, may not be associated with a visually taxing experience for the user. Frame 160C shows a presented version of the raw image data captured at t3 180, shown at 150C. In this frame, for this example, the device may determine that the change in brightness across the raw image frames 155A, 155B, and 155C are associated with a difference statistic that satisfy a trigger criterion. As such, before the image is presented to the user, a treatment is applied. For purposes of this example, the brightness of the overhead light is reduced at 155C, similar to that of overhead light 165B of frame 160B. However, in some embodiments, the device may determine a difference statistic between the rendered version of the overhead light in the second frame 165B and the raw version of the overhead light in the third frame 150C, would not satisfy the trigger criterion and, thus, may not apply a rendering treatment to the overhead light portion 155C of the raw image data 150C.

Figure 2:
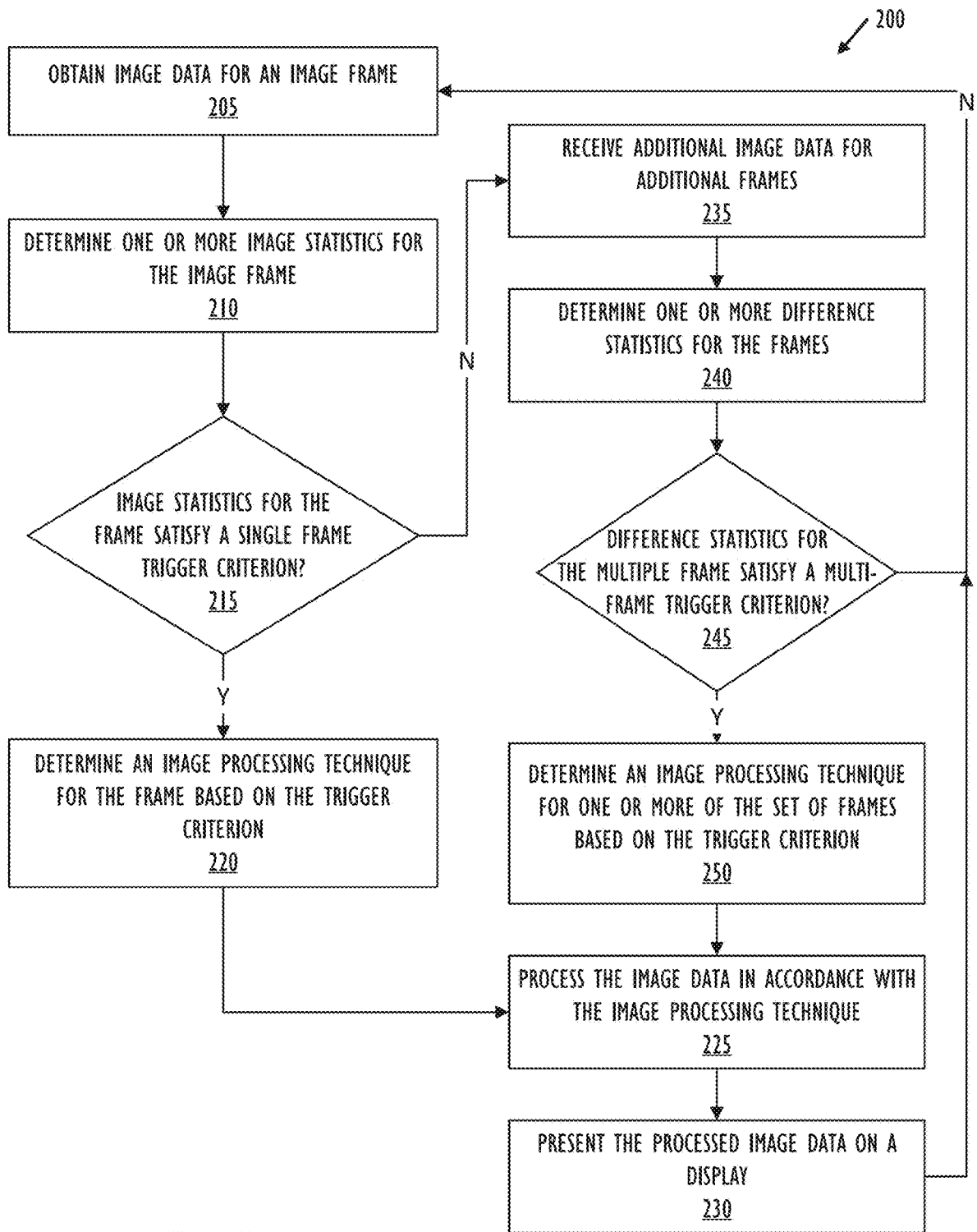
FIG. 2 shows, in flowchart form, an example process for applying a selected rendering technique to an image frame, in accordance with one or more embodiments.

FIG. 2 shows, in flowchart form, an example process for applying a selected rendering technique to an image frame, in accordance with one or more embodiments. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added, according to various embodiments.

The flowchart 200 begins at block 205 where the device obtains image data for an image frame. The image data may be captured by one or more cameras of a device through which a user is experiencing a physical environment in their surroundings. The image data obtained at 205 is obtained by one or more sensors, corresponding to the one or more cameras, and, as such, may comprise pre-processed image data.

The flowchart continues at block 210 where one or more image statistics are determined for the image frame. In one or more embodiments, the image statistics may be associated with image characteristics, which may correspond to a feature that could be visually taxing for a user, within the single frame. For example, in some embodiments the image statistics may be used to detect triggering patterns in the image data. As an example, the image statistics may identify a change in brightness across a gradient, indicating a particular pattern. In some embodiments, the image may be analyzed to determine content in the image. For example, a segmentation network may be applied to identify portions of the image corresponding to individual objects. Further, in some embodiments, a user's gaze may be considered for determining a portion of the image, which should be considered for determining whether the portion includes triggering content. For example, a target region corresponding to the tracked gaze can be used to identify the portion of the image. Then, the image statistic may be determined for one or more portions of the image, for which an individual object is determined to be present.

In some embodiments, a portion of the image content may be analyzed. For example, the device may include gaze tracking sensors, such as user-facing cameras and the like, to collect sensor data corresponding to a user's eyes. From this sensor data, a gaze direction of the user may be determined. A portion of the raw image data corresponding to the user's gaze may be identified, and this image data may be used to determine one or more image statistics.

The flowchart continues at block 215, and a determination is made regarding whether the one or more image statistics satisfy a single frame trigger criterion. That is, the one or more image statistics may be compared against a predetermined criterion, indicating that one or more statistics may indicate a triggering condition, such as a particular pattern of brightness present in the frame. If, at block 215, a determination is made that the image statistics satisfy a single frame trigger criterion, then the flowchart continues to block 220, and an image processing technique is determined for the frame, based on the trigger criterion. The image processing technique may include, for example, modifying an image parameter for the frame. The image parameter may include, for example, a brightness adjustment applied to a portion of the image, a texture applied to a portion of the image, a blur treatment applied to a portion of the image, and the like. In some embodiments, the portion of the image may be determined to include the pixels in the image that correspond to the detected visual trigger, such as a particular pattern or flicker. Further, in some embodiments, the portion of the image may be determined based on image content that includes portions of the scene, such as the sky or a window region.

The flowchart continues at block 225, and the system processes the image data in accordance with the image processing technique. Notably, the raw image data is modified between being captured by the sensor, and before it is presented to a user, such that the post-processed image data no longer satisfies the trigger condition when it is displayed to the user at block 230.

Returning to block 215, if it is determined that the image statistics for the frame do not satisfy a single frame trigger criterion, then the flowchart continues to block 235. At block 235, additional image data is received for additional frames. That is, the sensor data continues to receive sensor data, so that image statistics can be determined across multiple frames. In some embodiments, a single additional frame may be received, or multiple additional frames may be received. For example, a particular frequency of a change of brightness may be a trigger, and that frequency may require multiple frames to identify, due to frame rates at which the frames are captured. At block 240, one or more difference statistics are captured across frames. For example, the statistics may indicate a change in brightness at a particular region across frames, such that the resulting display condition is predicted to cause a visually taxing event for a user. For example, the display condition may be a pattern or texture determined to trigger a visually taxing experience for a user. In some embodiments, object recognition, or other classification, may be performed on one or more of the frames, similar to that described above with respect to step 210, to determine individual regions of the image data across frames that correspond to a particular object, which may have the potential to cause the display condition.

At block 245, a determination is made as to whether one or more of the determined difference statistics for the multiple frames satisfy a multi-frame trigger criterion. For example, a determination may be made as to whether a threshold change in brightness occurs at a threshold and/or predetermined frequency, which is determined to have the potential to be visually taxing. If, at block 245, a determination is made that one or more of the difference statistics do not satisfy a multi-frame trigger criterion, then the flowchart 200 returns to block 205, and image data for additional image frames is captured, and the flowchart 200 proceeds to analyze image statistics within a single frame and across multiple frames.

If, at block 245, a determination is made that one or more of the difference statistics satisfy a multi-frame trigger criterion, then the flowchart proceeds to block 250. At block 250, an image processing technique is determined for one or more image frame of the sets of image frames, for which the image statistic satisfied the multi-frame trigger criterion. The image processing technique may include, for example, modifying an image parameter for one or more of the frames, such that the triggering display condition is mitigated. The image parameter may include, for example, a brightness adjustment applied to a portion of one or more of the images, a texture applied to a portion of one or more of the images, a blur treatment applied to a portion of one or more of the images, and the like. In some embodiment, an occluding visual effect may be applied to a portion of the image at which the triggering content is located to prevent the user from being exposed to the triggering content.

The flowchart continues at block 225, and the system processes the image data in accordance with the image processing technique. Notably, the raw image data is modified between being captured by the sensor, and before it is presented to a user, such that the post-processed image data no longer satisfies the trigger condition when it is displayed by the display at block 230.

Figure 3:
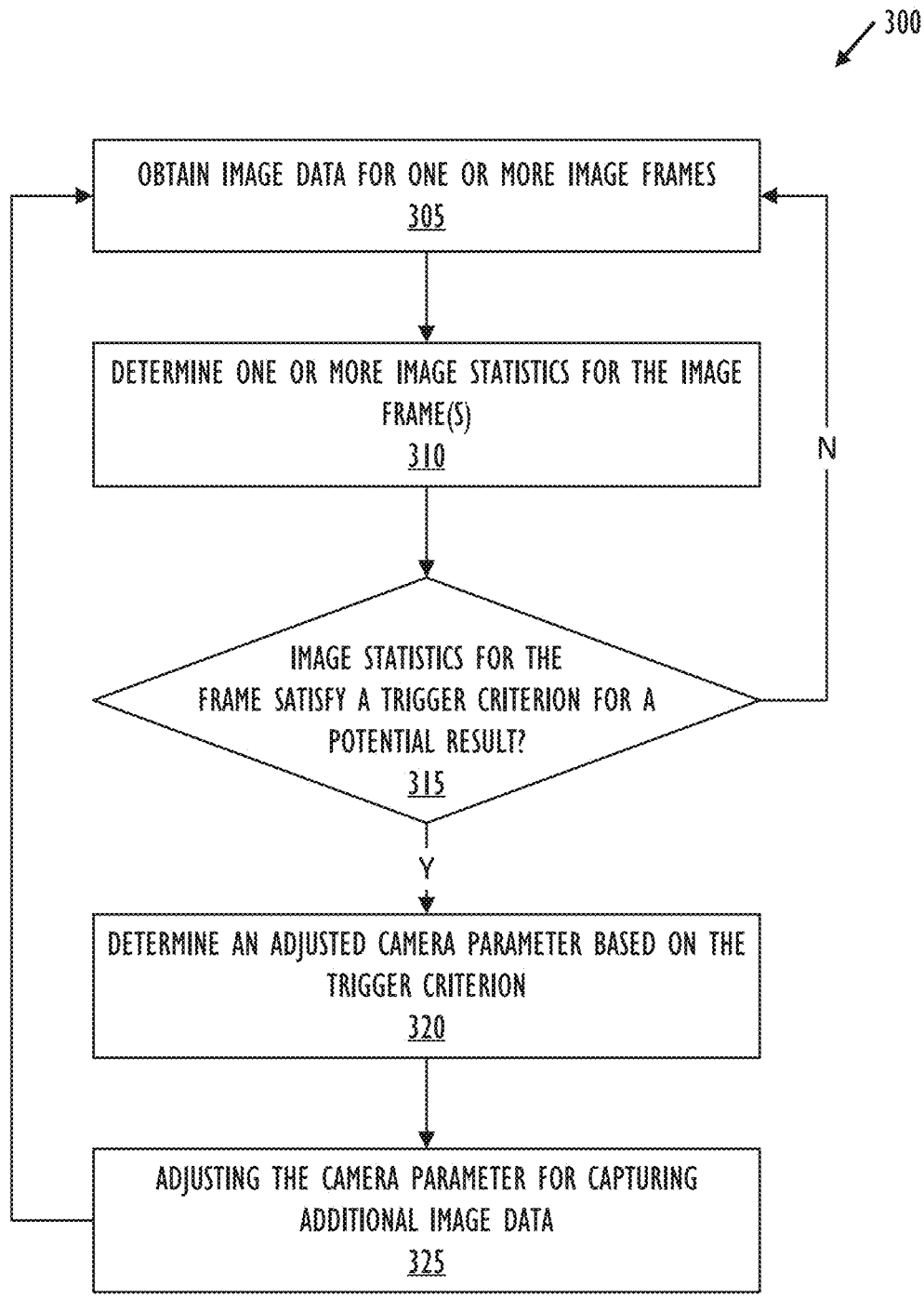
FIG. 3 shows, in flowchart form, an example process for applying a selected camera parameter to capture an image frame, in accordance with one or more embodiments.

In some embodiments, the visual trigger may be mitigated prior to capturing the image frame, once determined that the visual trigger is likely to occur, that may cause a visually taxing experience for a user. FIG. 3 shows, in flowchart form, an example process for applying a selected camera parameter to capture an image frame, in accordance with one or more embodiments. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added, according to various embodiments.

The flowchart 300 begins at block 305, where image data is collected for an image frame. The image data may be captured by one or more cameras that are part of a device through which a user is experiencing a physical environment in their surroundings. The image data obtained at 305 is obtained by one or more sensors corresponding to the one or more cameras and, as such, may comprise pre-processed image data.

The flowchart 300 proceeds to block 310, where one or more statistics are determined for the image frame or frames. That is, image statistics can be determined within a single frame and/or across multiple frames, as described above. At block 315, a determination is made regarding whether one or more of the image statistics satisfy a trigger criterion indicative of a potential triggering event. The image statistics in this scenario may be statistics about the image data that predict an upcoming triggering display condition. For example, certain objects may be associated with a triggering condition, or a brightness pattern that may indicate an upcoming triggering condition. If, at block 315, a determination is made that the image statistics do not satisfy the trigger criterion, then the flowchart 300 returns to block 305, and the one or more cameras of the device continue to capture image data.

Returning to block 315, if a determination is made that the image statistics do satisfy the trigger criterion, then the flowchart proceeds to block 320, and an adjusted camera parameter is determined, based on the trigger criterion. In some embodiments, the adjusted camera parameter may be a camera parameter which, when applied to the camera, causes the camera to capture the image data in a manner such that the triggering condition is not present in the resulting image data. For example, if based on the image statistics, a determination is made that something bright will occur in the environment, then the camera parameter may be applied such that when the bright event is presented to the user on a display, the brightness of the event does not include the characteristics of a triggering event. Thus, the flowchart concludes at block 325, and the camera parameter is adjusted based on the adjusted camera parameter determined at 320, and the flowchart returns to block 305, where additional image data is obtained.

Figure 4:
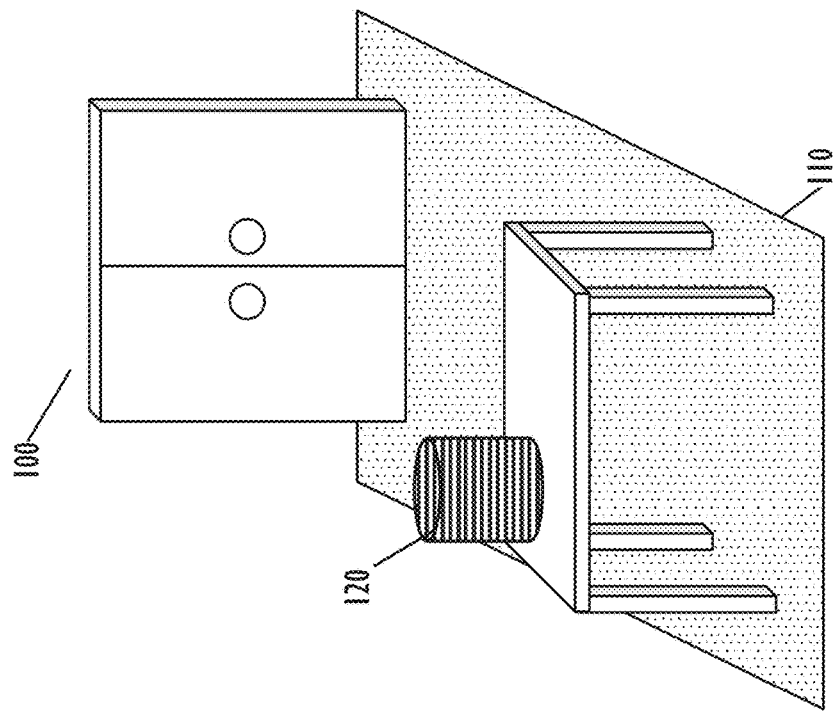
FIG. 4 shows an example diagram of an image capture process, in accordance with one or more embodiments.
Figure 4:
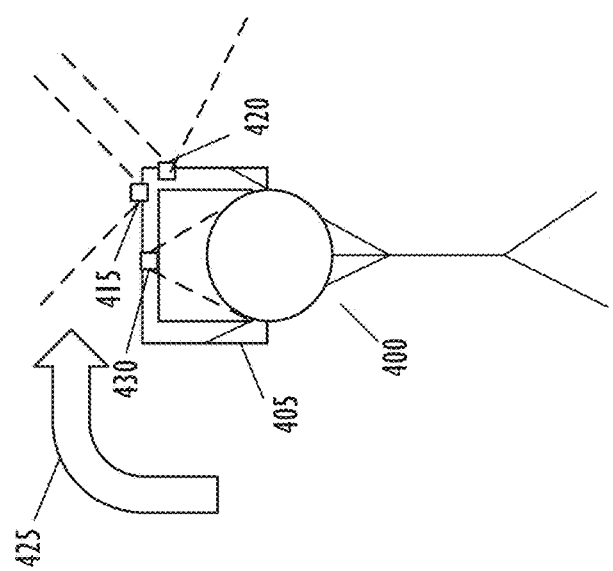

In some embodiments, a device providing the image capture and display may include multiple cameras capturing images of the environment from different points of view concurrently. For example, as shown in FIG. 4, an example diagram is depicted correspond to the image data 100, according to one or more embodiments. According to some embodiments, image data may be captured by a camera on a device 405 being held by a user 400. The device may be, for example, a hand-held mobile device, or a wearable device such as a head-mounted device. The device may have multiple cameras facing different directions, by which image data is obtained to provide a display, such as camera 415 and camera 420. In this example, the camera 420 faces towards a scene, whereas camera 415 faces a different direction. The device 405 may be configured to present a live view of the physical environment to the user in the form of the image data 100. The scene of the physical environment has multiple objects with various textures, patterns, colors, and the like. As shown, the physical environment includes a rug 110, having a dotted pattern, upon which a table is placed. On the table is a cylinder 120, having a striped pattern. For purposes of this example, the striped pattern of cylinder 120 may cause a visually taxing experience for a user. While cylinder 120 is in the field of view of camera 420, it is not in the field of view of camera 415, which, for purposes of this example, is the camera used by the device to provide image content for display to the user 400.

According to one or more embodiments, a user may not experience the visual trigger because it is not in the field of view of the camera 415. However, in some embodiments, the visual trigger may be detected in image data, captured by one or more alternative cameras on the device. For example, while camera 420 may not be used to collect data for display, it may still collect image data of the environment, from which the triggering condition can be detected. According to one or more embodiments, the device may include one or more sensors, by which a user's movement can be detected, such as a gyroscopic sensor. In some embodiments, if the user is determined to move in the direction, such that the potential triggering condition will be in the user's field of view, then the image captured by the camera for display can be augmented, such that the user 400 is not exposed to the triggering item 120. For example, if a triggering condition is detected in image data captured from camera 420, then, when the user is determined to move to face the triggering condition, as shown by arrow 425, then a camera parameter for camera 415 may be modified to as to avoid capturing image data having the triggering condition. Additionally, or alternatively, an image processing treatment can be determined, such that when the image data collected by camera 415 includes the cylinder 120, the raw image data can be processed in a manner such that the triggering feature is not present in the processed image data.

In some embodiments, the change in the user's field of view may be determined, for example, from data collected by an accelerometer, a global positioning system, a gyroscope, a computer vision system, and the like. Further, in some embodiments, one or more eye tracking sensors 430 can be used to determine gaze direction and the like. As such, in some embodiments, eye tracking data can be used to determine a user's field of view.

Figure 5:
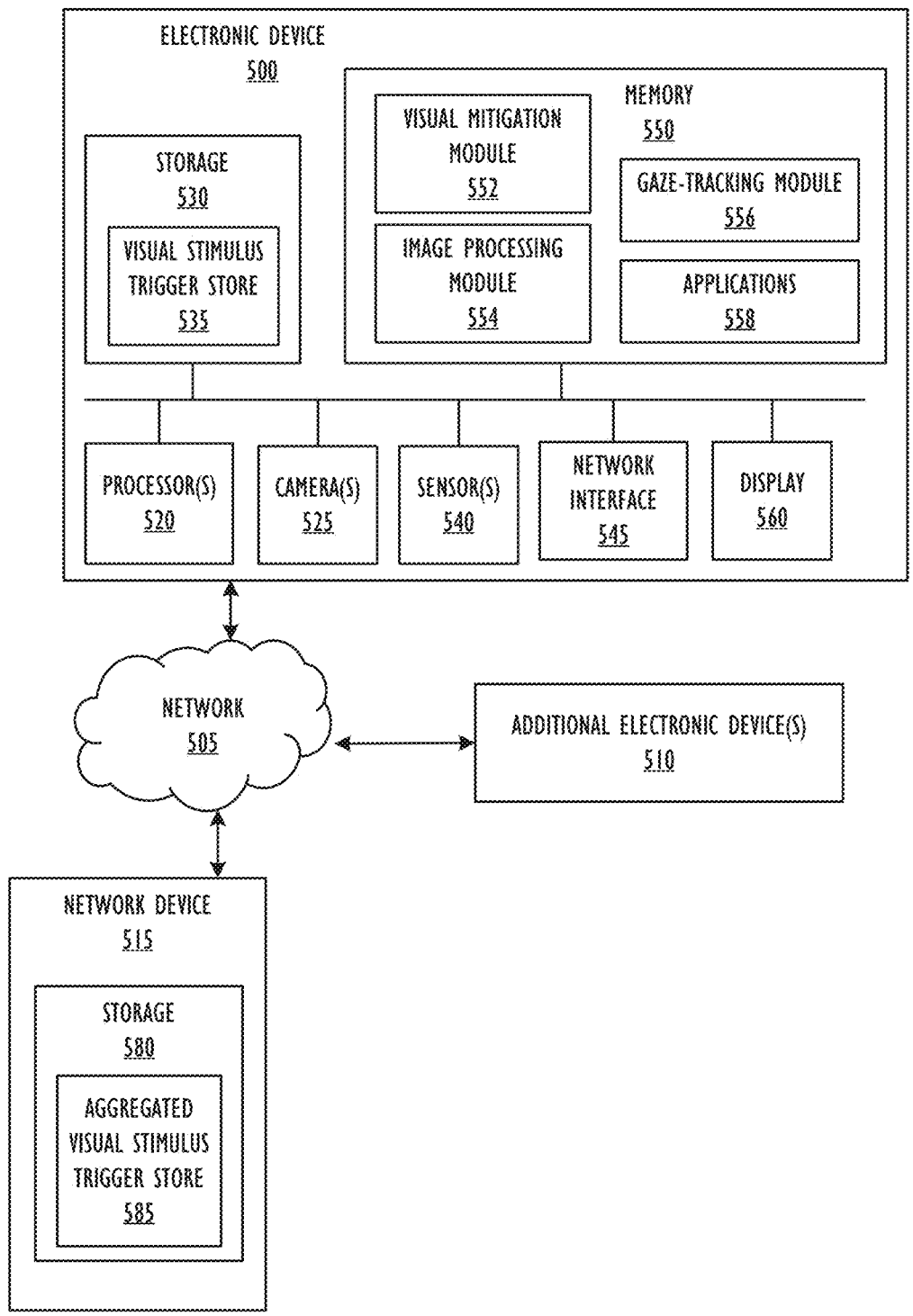
FIG. 5 shows, in block diagram form, an example network diagram, according to one or more embodiments.

FIG. 5 depicts a network diagram for a system by which various embodiments of the disclosure may be practiced. Specifically, FIG. 5 depicts an electronic device 500 that is a computer system. Electronic device 500 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 500 may be connected to other devices across a network 505, such as an additional electronic device 510, mobile devices, tablet devices, desktop devices, and remote sensing devices, as well as network storage devices, such as network device 515, and the like. Illustrative networks include, but are not limited to, a local network such as a universal serial bus (USB) network, an organization's local area network, and a wide area network, such as the Internet.

Electronic device 500, additional electronic device 510, and/or server device 515, may additionally, or alternatively, include one or more additional devices within which the various functionality may be contained, or across which the various functionality may be distributed, such as server devices, base stations, accessory devices, and the like. It should be understood that the various components and functionality within electronic device 500, additional electronic device 510, and network device 515 may be differently distributed across the devices, or may be distributed across additional devices.

Electronic device 500 may include a processor 520. Processor 520 may be a system-on-chip, such as those found in mobile devices, and include one or more central processing units (CPUs), dedicated graphics processing units (GPUs), or both. Further, processor 520 may include multiple processors of the same or different type. Electronic device 500 may also include a memory 550. Memory 550 may include one or more different types of memory, which may be used for performing device functions in conjunction with processor 520. For example, memory 550 may include cache, ROM, RAM, or any kind of transitory or non-transitory computer readable storage medium, capable of storing computer readable code. Memory 550 may store various programming modules during execution, such as visual mitigation module 552, which is configured to determine image statistics in image data and determine how to mitigate triggering content in the image. Memory 550 also includes image processing module 554, which is configured to perform image processing tasks on raw image data collected, for example, by camera(s) 525, and cause the processed image data to be presented on display 560. Memory 550 may include a gaze tracking module 556, which can use eye tracking sensors, or other sensor(s) 540, to determine a portion of a scene at which a user's eyes are directed. Further, memory 550 may include one or more additional applications 558.

Electronic device 500 may also include storage 530. Storage 530 may include one more non-transitory computer-readable mediums including, for example, magnetic disks (fixed, floppy, and removable) and tape, optical media such as CD-ROMs and digital video disks (DVDs), and semiconductor memory devices, such as Electrically Programmable Read-Only Memory (EPROM), and Electrically Erasable Programmable Read-Only Memory (EEPROM). Storage 530 may be utilized to store various data and structures which may be utilized for mitigating triggering conditions. For example, storage 530 may include a visual stimulus trigger store 535. The visual stimulus trigger store 535 may include trigger criteria, which cause a mitigating action to be performed. The mitigating criteria may indicate one or more characteristics in image data, which cause a display condition that results in image data considered to cause a visually taxing experience for a user. Additionally, or alternatively, the visual stimulus trigger store may include data stored in additional electronic device 510, and/or in storage 580 of network device 515, in the form of aggregated visual stimulus trigger store, which may store trigger criteria from multiple users.

Electronic device 500 may include a set of sensors 540. In this example, the set of sensors 540 may include one or more image capture sensors, an ambient light sensor, a motion sensor, an eye tracking sensor, and the like. In other implementations, the set of sensors 540 further includes an accelerometer, a global positioning system (GPS), a pressure sensor, and the inertial measurement unit (IMU), and the like.

Electronic device 500 may allow a user to interact with XR environments. Many electronic systems enable an individual to interact with and/or sense various XR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display, may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph), Other examples of XR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

Figure 6:
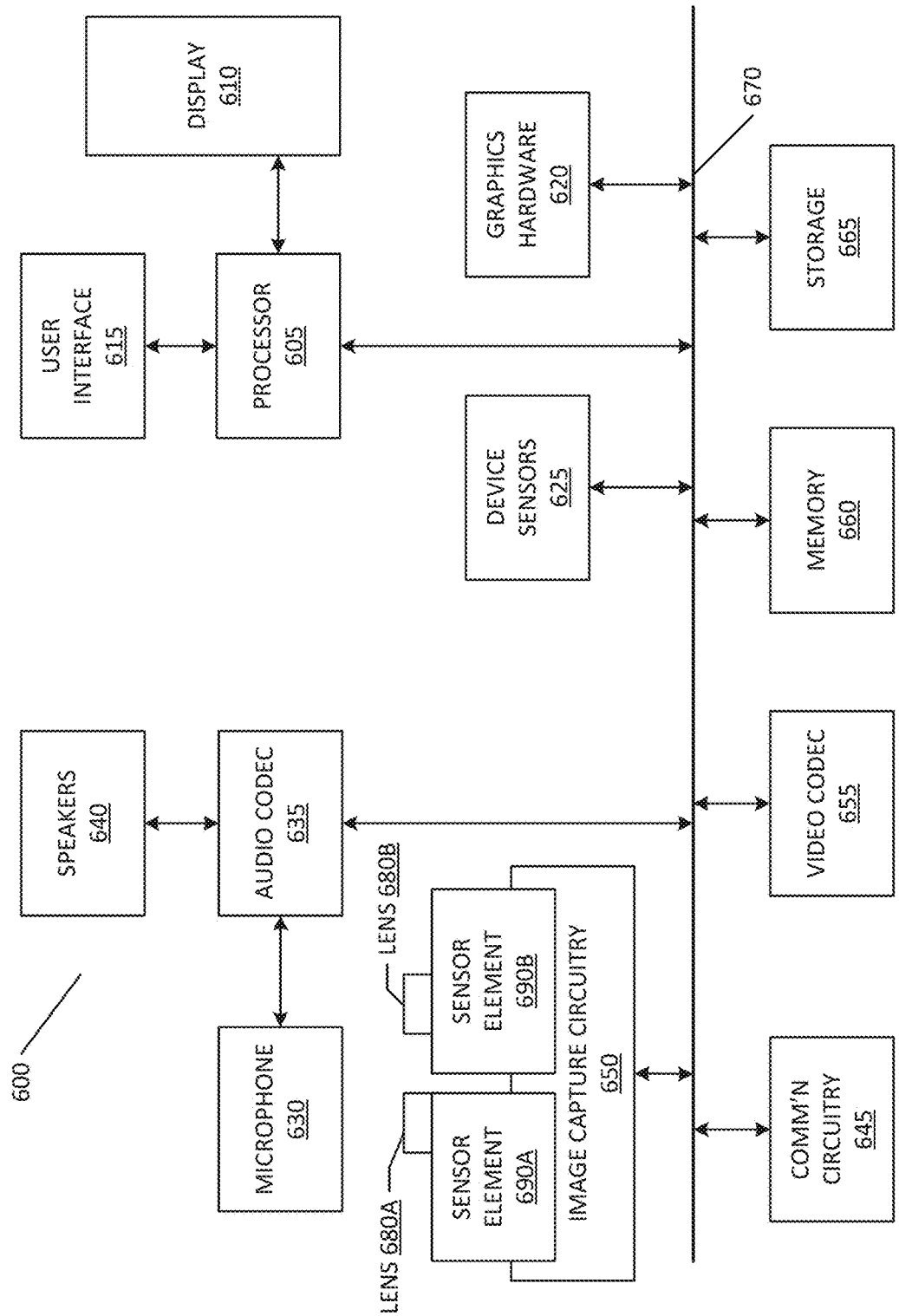
FIG. 6 shows, in block diagram form, a mobile device in accordance with one or more embodiments.

Referring now to FIG. 6, a simplified functional block diagram of illustrative multifunction electronic device 600 is shown according to one embodiment. Each of electronic devices may be a multifunctional electronic device, or may have some or all of the described components of a multifunctional electronic device described herein. Multifunction electronic device 600 may include some combination of processor 605, display 610, user interface 615, graphics hardware 620, device sensors 625 (e.g., proximity sensor/ambient light sensor, accelerometer and/or gyroscope), microphone 630, audio codec 635, speaker(s) 640, communications circuitry 645, digital image capture circuitry 650 (e.g., including camera system), memory 660, storage device 665, and communications bus 670. Multifunction electronic device 600 may be, for example, a mobile telephone, personal music player, wearable device, tablet computer, and the like.

Processor 605 may execute instructions necessary to carry out or control the operation of many functions performed by device 600. Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen, touch screen, and the like. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures, or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include one or more lens assemblies, such as 680A and 68013. The lens assemblies may have a combination of various characteristics, such as differing focal length and the like. For example, lens assembly 680A may have a short focal length relative to the focal length of lens assembly 68013. Each lens assembly may have a separate associated sensor element 690. Alternatively, two or more lens assemblies may share a common sensor element. Image capture circuitry 650 may capture still images, video images, enhanced images, and the like. Output from image capture circuitry 650 may be processed, at least in part, by video codec(s) 655, and/or processor 605, and/or graphics hardware 620, and/or a dedicated image processing unit or pipeline incorporated within circuitry 645. Images so captured may be stored in memory 660 and/or storage 665.

Memory 660 may include one or more different types of media used by processor 605 and graphics hardware 620 to perform device functions. For example, memory 660 may include memory cache, read-only memory (ROM), and/or random-access memory (RAM). Storage 665 may store media (e.g., audio, image, and video files), computer program instructions or software, preference information, device profile information, and any other suitable data. Storage 665 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or computer readable code, organized into one or more modules, and written in any desired computer programming language. When executed by, for example, processor 605, such computer program code may implement one or more of the methods described herein.

It is to be understood that the above description is intended to be illustrative, and not restrictive. The material has been presented to enable any person skilled in the art to make and use the disclosed subject matter as claimed, and is provided in the context of particular embodiments, variations of which will be readily apparent to those skilled in the art (e.g., some of the disclosed embodiments may be used in combination with each other). Accordingly, the specific arrangement of steps or actions shown in FIGS. 2-3, or the arrangement of elements shown in FIGS. 1 and 4-6, should not be construed as limiting the scope of the disclosed subject matter. The scope of the invention, therefore, should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
    obtaining an image frame comprising image data captured by a camera;
    determining, from the image data, an image statistic for at least a portion of the image frame;
    determining that the image statistic satisfies a trigger criterion, wherein the trigger criterion is associated with at least one predetermined display condition;
    modifying, in response to determining that the image statistic satisfies the trigger criterion, an image parameter for the at least a portion of the image frame;
    rendering the image frame in accordance with the modified image parameter, wherein the predetermined display condition is avoided in the rendered image frame in accordance with the rendering; and
    displaying the rendered image frame.

2. The method of claim 1, wherein the predetermined display condition comprises at least one selected from a group consisting of a predetermined pattern and a predetermined texture.

3. The method of claim 2, wherein modifying the image parameter of the image frame comprises at least one of:
    applying a visual effect to the at least a portion of the image frame;
    obscuring the at least a portion of the image; and
    removing the at least a portion of the image.

4. The method of claim 1, further comprising:
    obtaining image data captured by the camera for a second image frame;
    determining a second image statistic for the second image frame; and
    determining that the second image statistic satisfies a second trigger criterion, wherein the second trigger criterion is associated with at least one potential predetermined display condition.

5. The method of claim 4, further comprising:
    adjusting, in response to determining the second trigger criterion is satisfied, a camera parameter of the camera, wherein additional image data for additional image frames are captured by the camera in accordance with the adjusted camera parameter.

6. The method of claim 1, further comprising:
tracking a gaze of a user to identify a target region of the image frame,
wherein the image parameter is further modified in accordance with the tracked gaze of the user.

7. The method of claim 1, further comprising:
obtaining image data for a second image frame captured by a second camera, wherein the second camera corresponds to a portion of an environment outside a user's field of view;
determining a second image statistic for the second image frame;
determining that the second image statistic satisfies the trigger criterion; and
in accordance with a detecting a change in the user's field of view in a direction of the portion of the environment, modifying an image parameter for the second image frame.

8. The method of claim 7, wherein the change in the user's field of view is detected based on position information from at least one selected from a group consisting of an accelerometer, a global positioning system, a gyroscope, and a computer vision system.

9. A non-transitory computer readable medium comprising computer readable code executable by one or more processors to:
obtain an image frame comprising image data captured by a camera;
determine, from the image data, an image statistic for at least a portion of the image frame;
determine that the image statistic satisfies a trigger criterion, wherein the trigger criterion is associated with at least one predetermined display condition;
modify, in response to determining that the image statistic satisfies the trigger criterion, an image parameter for the at least a portion of the image frame;
render the image frame in accordance with the modified image parameter, wherein the predetermined display condition is avoided in the rendered image frame in accordance with the rendering; and
display the rendered image frame.

10. The non-transitory computer readable medium of claim 9, wherein the predetermined display condition comprises at least one selected from a group consisting of a predetermined pattern and a predetermined texture.

11. The non-transitory computer readable medium of claim 10, wherein modifying the image parameter of the image frame comprises at least one of:
applying a visual effect to the at least a portion of the image frame;
obscuring the at least a portion of the image; and
removing the at least a portion of the image.

12. The non-transitory computer readable medium of claim 9, further comprising computer readable code to:
obtain image data captured by the camera for a second image frame;
determine a second image statistic for the second image frame; and
determine that the second image statistic satisfies a second trigger criterion, wherein the second trigger criterion is associated with at least one potential predetermined display condition.

13. The non-transitory computer readable medium of claim 12, further comprising computer readable code to:

adjust, in response to determining the second trigger criterion is satisfied, a camera parameter of the camera, wherein additional image data for additional image frames are captured by the camera in accordance with the adjusted camera parameter.

14. The non-transitory computer readable medium of claim 9, further comprising computer readable code to:
track a gaze of a user to identify a target region of the image frame,
wherein the image parameter is further modified in accordance with the tracked gaze of the user.

15. The non-transitory computer readable medium of claim 9, further comprising computer readable code to:
obtain image data for a second image frame captured by a second camera,
wherein the second camera corresponds to a portion of an environment outside a user's field of view;
determine a second image statistic for the second image frame;
determine that the second image statistic satisfies the trigger criterion; and
in accordance with a detecting a change in the user's field of view in a direction of the portion of the environment, modify an image parameter for the second image frame.

16. The non-transitory computer readable medium of claim 15, wherein the change in the user's field of view is detected based on position information from at least one selected from a group consisting of an accelerometer, a global positioning system, a gyroscope, and a computer vision system.

17. A system comprising:
one or more processors; and
one or more computer readable media comprising computer readable code executable by the one or more processors to:
obtain an image frame comprising image data captured by a camera;
determine, from the image data, an image statistic for at least a portion of the image frame;
determine that the image statistic satisfies a trigger criterion,
wherein the trigger criterion is associated with at least one predetermined display condition;
modify, in response to determining that the image statistic satisfies the trigger criterion, an image parameter for the at least a portion of the image frame;
render the image frame in accordance with the modified image parameter, wherein the predetermined display condition is avoided in the rendered image frame in accordance with the rendering; and
display the rendered image frame.

18. The system of claim 17, wherein the predetermined display condition comprises at least one selected from a group consisting of a predetermined pattern and a predetermined texture.

19. The system of claim 18, wherein modifying the image parameter of the image frame comprises at least one of:
applying a visual effect to the at least a portion of the image frame;
obscuring the at least a portion of the image; and
removing the at least a portion of the image.

20. The system of claim 17, further comprising computer readable code to:
obtain image data captured by the camera for a second image frame;

determine a second image statistic for the second image frame; and determine that the second image statistic satisfies a second trigger criterion, wherein the second trigger criterion is associated with at least one potential predetermined display condition.

\* \* \* \* \*